US005796785A

United States Patent [19]

Spiero

[11] Patent Number: 5,796,785

[45] Date of Patent: Aug. 18, 1998

[54] DIGITAL AUDIO BROADCAST RECEIVER HAVING CIRCUITRY FOR RETRIEVING EMBEDDED DATA AND FOR SUPPLYING THE RETRIEVED DATA TO PERIPHERAL DEVICES

[75] Inventor: Richard C. Spiero, Eindhoven, Netherlands

[73] Assignee: U.S. Philips Corporation, New York, N.Y.

[21] Appl. No.: 724,389

[22] Filed: Oct. 1, 1996

[30] Foreign Application Priority Data

Oct. 4, 1995 [EP] European Pat. Off. .............. 95202670

[51] Int. Cl.$^6$ .......... H04L 29/10

[52] U.S. Cl. .......... 375/316; 375/377

[58] Field of Search .......... 375/316, 340, 375/259, 342, 346, 377; 364/710.1, 715.03

[56] References Cited

U.S. PATENT DOCUMENTS

| | | | |
|---|---|---|---|
| 5,483,686 | 1/1996 | Saka et al. | 455/182.2 |
| 5,483,690 | 1/1996 | Schroder | 455/226.1 |
| 5,692,016 | 11/1997 | Vanselow | 375/344 |

OTHER PUBLICATIONS

DAB452—"Digital Audio Broadcast Test Receiver"—Release date: Feb. 1995, Predecessor:None, Date of issue: May 1994.

IEC958 "Digital Audio Interface", First Edition 1989 Mar.

ETS 300 401 European Telecommunication Standard—"Radio Broadcasting Systems; Digital Audio Broadcasting (DAB) to mobile, portable and fixed receivers", Feb. 95.

*Primary Examiner*—Chi H. Pham
*Assistant Examiner*—William Luther
*Attorney, Agent, or Firm*—Edward W. Goodman

[57] ABSTRACT

A receiver and a method for adding a sequence, embedded in a digital sequence of data together with another sequence, separate of the other sequence to at least a part of the digital sequence of data. An example of such a sequence is the Program Associated Data (PAD) in a DAB digital sequence of data, this PAD being embedded in audio frames together with audio data. The DAB digital sequence of data is converted into a sequence according to the IEC958 format, wherein the retrieved PAD is inserted into the User Data channel in the IEC958 frames. This allows an easy retrieval of the PAD from the digital sequence of data, without the need for analyzing audio frames and retrieving the PAD therefrom.

8 Claims, 2 Drawing Sheets

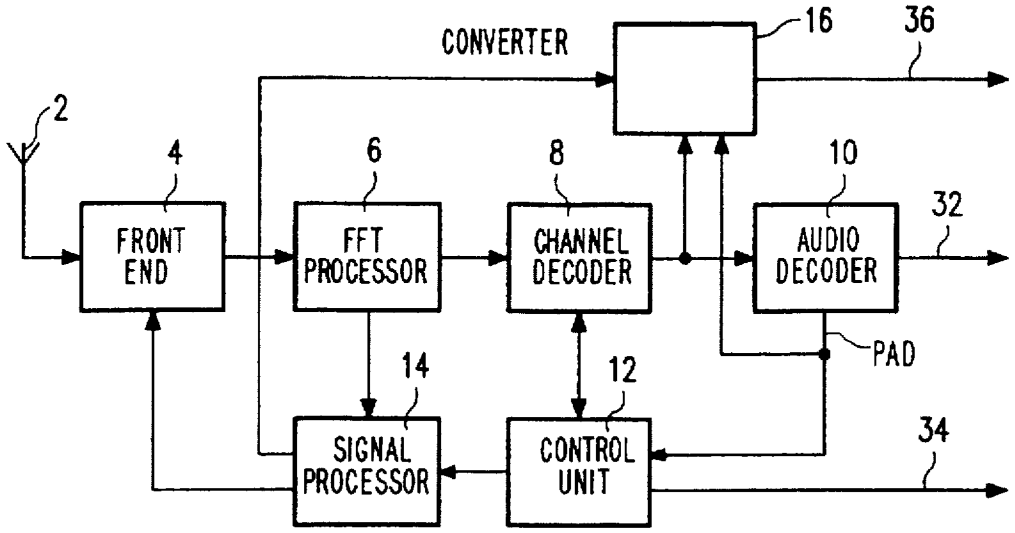
FIG. 1
FIG. 2
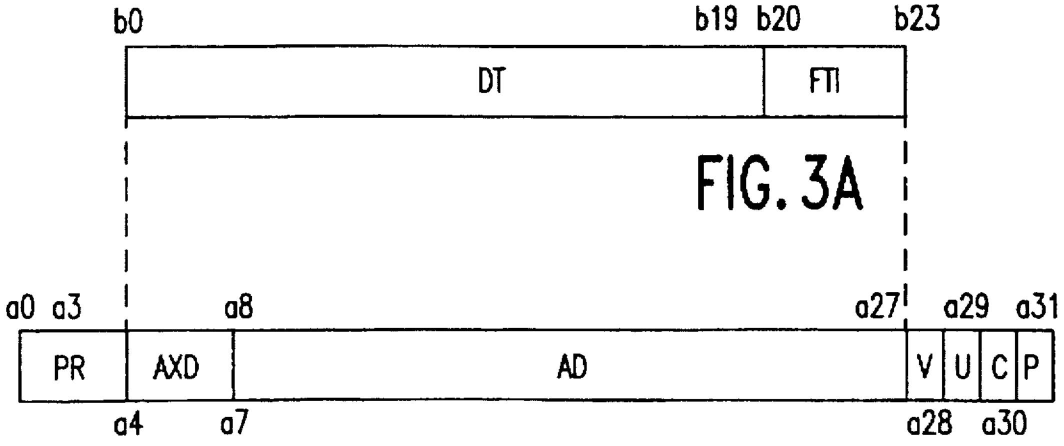
FIG. 3A
FIG. 3B

DIGITAL AUDIO BROADCAST RECEIVER HAVING CIRCUITRY FOR RETRIEVING EMBEDDED DATA AND FOR SUPPLYING THE RETRIEVED DATA TO PERIPHERAL DEVICES

BACKGROUND OF THE INVENTION

1. Field of the Invention

The invention relates to a receiver for receiving a digital transmission signal, said digital transmission signal comprising a channel encoded digital sequence of data, said digital sequence of data comprising a plurality of sequences of different data types, at least one sequence out of said plurality of sequences of different data types being embedded in the digital sequence of data together with at least one other sequence out of said plurality of sequences of different data types, the receiver comprising:

means for channel decoding a received digital transmission signal forming the digital sequence of data, means for supplying the digital sequence of data from the received and decoded signal, means for retrieving the at least one sequence which had been embedded in the digital sequence of data.

The invention further relates to a method of supplying at least a part of a digital sequence of data, said digital sequence of data comprising a plurality of sequences of different data types, at least one sequence out of said plurality of sequences of different data types being embedded in the digital sequence of data together with at least one other sequence out of said plurality of sequences of different data types.

2. Description of the Related Art

A receiver according to the preamble is known from a folder "DAB452 Digital Audio Broadcasting test receiver", published by Philips Consumer Electronics, The Netherlands, February 1995.

In the known receiver, a received Digital Audio Broadcast signal is frequency converted and demodulated in a Fast Fourier Transform device, de-interleaved and channel decoded into a digital sequence of data, comprising a plurality of sequences of different data types, such as Main Service Channel data, which comprises a.o. audio frames, Fast Information Channel data, etc. An audio frame in the Main Service Channel comprises audio data and Program Associated Data (PAD). The maximum amount of audio data in an audio frame depends on the amount of PAD in said frame. Thus the PAD is embedded in the digital sequence of data together with audio data. The known DAB receiver comprises, for these purposes, audio decoding means, which not only retrieve the audio data from the audio frames, but also retrieves the PAD therefrom.

SUMMARY OF THE INVENTION

An object of the present invention is to provide an improved receiver and an improved method for supplying a digital sequence of data.

A receiver according to the invention is characterized in that the supplying means are arranged for adding the retrieved at least one sequence separately from the at least one other sequence to the at least part of the digital sequence of data.

The present invention is based on the recognition that peripheral devices, receiving the digital sequence of data, do not always comprise decoding means for retrieving embedded data. Thus, they need to comprise extra analyzing and retrieving means for obtaining such data. By adding the at least one sequence a second time to the data stream in a fixed format, a peripheral device can more easily identify and retrieve the at least one sequence from said digital sequence of data, thereby reducing the complexity of the peripheral device. For example, in a DAB receiver, a decoding means for decoding the audio frames is present. In these audio decoding means, the PAD is decoded as well. As the thus retrieved PAD is already available within the DAB receiver, this can be used advantageously for providing the PAD to the supplying means.

An embodiment of the invention is characterized in that the supplying means are operative to add a data type identifier to the retrieved at least one sequence for identifying the data type in the at least one sequence.

This measure allows an easy recognition of the at least one sequence within the digital sequence of data. This is especially advantageous in a digital sequence of data, wherein data is organized into packets, comprising a header, containing information on the packet itself.

An embodiment of the invention is characterized in that the supplying means are operative to add a length indicator to the retrieved at least one sequence for identifying a length of the at least one sequence.

This measure allows a peripheral device to know how long the at least sequence is going to be. This is especially advantageous when the at least one sequence can have a variable length and is very useful if the data is organized in packets.

An embodiment of the invention is characterized in that the supplied digital transmission signal is a Digital Audio Broadcast signal and in that the at least one sequence is Program Associated Data.

The measures according to the invention are particularly advantageous for application in a DAB receiver, wherein the at least one sequence is Program Associated Data.

An embodiment of the invention is characterized in that the at least part of the digital sequence of data is organized according to the IEC958 format. This realizes a more standardized interface with peripheral devices, as the DAB data sequence has a very specific format, whereas the IEC958 interface is more commonly used.

An embodiment of the invention is characterized in that the supplying means are arranged for adding the at least one sequence to a User Data channel in the IEC958 format. The User Data channel in the IEC958 interface is available for a plurality of purposes. By selecting the User Data channel for conveying the PAD, the retrieved PAD need not be added into the normal frame structure of the IEC958 format, thus saving data capacity for the original data.

BRIEF DESCRIPTION OF THE DRAWINGS

The above object and features of the present invention will be more apparent from the following description of the preferred embodiments with reference to the drawings, wherein:

FIG. 1 is a diagram of an embodiment of a receiver for receiving digital symbols according to the invention;

FIG. 2 is a diagram of a DAB transmission frame;

FIG. 3A is a diagram of a frame of the second sequence according to an embodiment of the invention;

FIG. 3B is a diagram of an IEC958 subframe;

DESCRIPTION OF THE PREFERRED EMBODIMENTS

Figure 4:
FIG. 4 is a diagram of an example of the structure of a PAD message for use in a receiver according to the invention.

FIG. 1 is a diagram of an embodiment of a receiver for receiving digital signals according to the invention. A receiving antenna 2 is connected to a first input of the receiver. The input of the receiver is connected to an front-end unit 4. An output of the front end unit 4 is connected to an input of an FFT processor 6. An output of the FFT processor 6 is connected to an input of a channel decoder 8.

A receiver for receiving digital signals can be used in the Digital Audio Broadcast system (DAB). An OFDM signal, comprising a plurality of carriers on which digital signals are modulated, is received by the receiver and amplified and frequency converted in the front-end unit 4. The output signal of the front-end unit 4 is then applied to the FFT processor 6 for demodulation to obtain the digital signals. At the output of the FFT processor 6, coded and interleaved signals are available. The FFT processor 6 also provides information to a signal processor 14 for synchronization of the front-end 4. The signal processor 19 can also retrieve information from the FFT processor 6 regarding the field strength of the received transmissions and the identification of the transmitters, the Transmitter Identification Information, or TII. This TII is present in a Null symbol at the start of each DAB frame. The signals at the output of the FFT processor 6 are de-interleaved and decoded by the decoder 8 to obtain the reconstructed digital signals. An audio decoder, for example, the Philips SAA2500, is coupled to the output of the decoder 8 for decoding those digital signals comprising audio frames. At a first output, the audio decoder 10 provides Program Associated data, or PAD, which is embedded in the audio frames. This PAD is supplied to a control unit 12 for further processing. At a second output, the audio decoder 10 provides audio data 32. The control unit 12 further controls the tuning of the receiver and the decoding in the decoder 8. The control unit 12 has an interface comprising data 34 for receiving information from a user and to supply information to the user.

FIG. 2 is a diagram of a DAB transmission frame. The DAB frame comprises three fields: a Synchronization Channel SC, a Fast Information Channel FIC and a Main Service Channel MSC. The FIC comprises a number of Fast Information Blocks FIB. This number depends on the DAB transmission mode. In mode I, the DAB frame comprises 12 FIBs, in mode II,3 FIBs and in mode III,4 FIBs. The Main Service Channel comprises a number of Common Interleaved frames. This number also depends on the DAB transmission mode. In mode I, the DAB frame comprises 4 CIFs, in mode II,1 CIF and in mode III,1 CIF. In mode I, the first 3 FIBs are assigned to the first CIF, the second 3 FIBs to the second CIF, etc. The Main Service Channel is a time-interleaved data channel divided into a number of Subchannels, each having a Subchannel identification number SubChId, and each Subchannel may carry one or more service components, like audio, data, etc. The MSC is further divided into Capacity Units of 64 bits, and a Subchannel may occupy one or more of these Capacity Units. The organization of the Subchannels and their location in Capacity Units is transmitted in the FIC, among other items. For a detailed description of a DAB transmission frame, its structure and its contents, reference is made to the document "Radio Broadcast Systems; Digital Audio Broadcasting (DAB) to mobile, portable and fixed receivers.", ETS 300 401, published by the European Telecommunications Standards Institute, Sophia Antipolis, 1995.

In the receiver of FIG. 1, the decoder 8 as presently used can not decode the entire DAB sequence in total, but can only decode selected parts of the DAB data. For example, a user instructs the control unit 12 to supply the audio data from a program, for instance, "Radio 3", to the audio decoder 10. The control unit 12 then analyzes the FIC and determines on which Subchannel in the Main Service Channel the program of "Radio 3" is present. The control unit 12 then determines which Capacity Units are allocated to that Subchannel, for example, CU's 6, 7 and 8. The control unit 12 then instructs the decoder 8 to decode and output the decoded data from CU's 6, 7 and 8 and activate a first window signal to signal that the decoded data is present. The audio decoder 10 receives the data and the window signal, and supplies the audio data on its output. Thus, the decoder 8 can only supply a limited amount of data. A future decoder 8 will be able to supply the complete decoded data from a DAB signal.

The receiver of FIG. 1 further comprises, according to the invention, converting means 16, having:

- a first input coupled to the output of the decoder 8 for receiving the first sequence of data, the sequence comprises either an entire DAB data sequence or at least a part of said DAB data sequence, depending on the decoder 8 as mentioned previously and
- an output for supplying a second sequence of data 36, organized in frames of a second type, a frame length of the first type of frames being different from a frame length of the second type of frames, the second sequence comprising at least two separate sequences, each of the separate sequences being reserved for a different data type, and being arranged in frames of the second type, wherein each frame of the second type comprises a frame type identifier for identifying the separate sequences within the second sequence.

According to a further aspect of the invention, the converting means 16 has a second input coupled to a second output of the signal processor 14 for receiving TII, comprised in the Null symbol of a DAB signal. The signal processor 14 also supplies the relative field strength as measured from the FFT of the Null symbol, and if desired also the values of the in-phase and quadrature components of selected carrier pairs. The converting means 16 then may insert the TII and the other data, supplied by the signal processor 14, into the second sequence. How this is done is described in more detail further on when dealing with the contents of the frames in the second sequence.

According to another aspect of the invention, which even may be seen separate from the previous aspects of the invention, the converting means 16 has a third input coupled to the second output of the audio decoder 10, which provides the PAD. This PAD is then also inserted into the sequence. This can be done similar as with the TII and associated data, providing a separate data type identifier for PAD and inserting the PAD in a separate packet. This is not described in further details. In a preferred embodiment, which is described in more detail further on, the PAD is inserted into the second sequence in a User Data channel if the frames of the second type are frames according to the IEC958 format.

Another name for the converting means 16 is supplying means, as the converting means in fact supplies the second sequence of data to the outside world, a.o. peripheral devices, etc.

FIG. 3A is a diagram of a frame of the second sequence according to an embodiment of the invention. In the present invention, the first sequence of data is converted into a second sequence of data, having a frame length differing from the frame length in the first sequence. In an embodiment, the frame length in the second sequence is chosen to be 24 bits, wherein the first 20 bits b0 . . . b19 are reserved for data (DT), and bits b20 . . . b23, for a frame type identifier (FTI). This choice allows the frame of the second sequence to be incorporated in a subframe according to the IEC958 standard. For more details on this standard, reference is made to document "Digital Audio Interface", International Standard IEC 958, published by Bureau Central de la Commission Electrotechnique Internationale, Switzerland, 1989.

FIG. 3B is a diagram of an IEC958 subframe. The IEC958 comprises a 4-bit preamble PR, a 4-bit field for auxiliary data AXD, a 20-bit field for audio data AD and four 1-bit fields: a Validity flag bit V, a User Data channel bit U, a Channel Status bit C and a parity bit P. The Channel Status bit C carries one bit of a Channel Status word, giving information on the data carried in a channel. The User Data channel bit U carries a bit of the User Data channel. When the frame of the second sequence is incorporated in the IEC958 subframe, it is carried in bit locations a4 . . . a27. The Validity Flag bit V should then be set at "1" to avoid accidental decoding by an audio decoder. In the Channel Status word, the status should be set to "non-audio" (bit 1 of byte 0), "copyright" should be asserted (bit 2 of byte 0="0"). Bits 3, 4 and 5 of byte 0 shall be set to "000", and bits 6 & 7 of Byte 0 shall be set to Mode 0 (="00"). The category code "001" for Broadcast reception of digital audio shall be used (bits 0,1, 2 of byte 1="001"). The generation status bit shall be set to "original" (bit 7 of byte 1="0"). In byte 2 the source number and channel number shall be "unspecified" (byte 2="00000000"). The sampling frequency shall be 48 kHz (bits 0, 1, 2, 3 of byte 3="0100"). The clock accuracy of ±1000 ppm shall be "Level II" (bits 4, 5 of byte 3 ="00"). Thus it is recommended to set the first four bytes of the Channel Status word as follows: byte 0 at "01000000", byte 1 at "00100100", byte 2 at "00000000" and, byte 3 at "01000000". Bits 3, 4, 5, 6 in byte 1 are set to "0010", which is a proposal for an entry "DAB" to be defined in the category "Broadcast reception".

Table 1 shows an example for the values of bits b20 . . . b23 of the frame type identifier.

TABLE 1

Values of the frame type identifier bits b20..b23.

| b20..b23 | Frame type |
|---|---|
| 0000 | Padding |
| 0001 | Header of data |
| XX10 | Continuation of data |
| 0100 | End of data |
| 0101 | Frame synchronization |
| 0111 | Start of TII data (low capacity data transfer) |
| 1111 | Data (low capacity data transfer) |

Frame type identifier values "0001", "XX10", "0100" and "0111" denote a data transfer in packets. The values "0001" and "0111" signal the start of a packet, wherein the value "0111" even identifies the data type in the packet as well, the value "XX10" signals a continuation of the packet and the value "0100" signals the end of the packet. An advantage of data transfer in packets is that only little overhead is used, as only a header frame—and possibly a trailer frame—are used as overhead, signalling for example, the data type and the length of the packet. This high capacity data transfer is especially useful in combination with future channel decoders 8 that can decode the complete DAB data.

Frame type identifier value "XX10" means that the values of bits b20 and b21 do not matter. This is especially useful if the 20 data bits, provided by bits b0 . . . b19, are not sufficient and one or two more data bits are needed in a continuation frame. In this case, bits b20 and b21 are added to the data bits, thereby realizing a datafield of 22 bits. If bits b20 and b21 are not used as data bits, depending on the data type in the packet, they should preferably set at "00". For example, in the case of MSC data, the bits b20 and b21 are added to the data field, whereas in the case of FIC or TII data, the bits b20 and b21 are part of the frame type identifier.

Frame type identifier value "1111" signals a frame comprising data and its data type identifier. As each frame comprises such an identifier, it is possible to process each frame independently from the other. This makes processing of frames at the receiving end very easy at the cost of a large overhead as now all frames need to contain a data type identifier.

Frame type identifier value "0000" signals a padding frame, comprising on all positions b0 . . . b19 normally only a logical "0". This frame type is used when no data is ready to be transferred, and ensures a continuous flow of frames in the second sequence when no data is present.

Frame type identifier value "0101" signals the start of a frame in the first sequence, i.e., a logical DAB frame, for example. This frame may contain on its remaining bit locations b0 . . . b19 some information. To this extend, bits b0 . . . b3 are reserved for a Synchronization Frame Contents Indicator SFCI, in this case for example, having a value of "0001", indicating that a Contents Field CF, i.e., the remaining bits b4 . . . b19, contains the number of corrected errors detected by re-encoding of the FIC of the previous DAB frame. Other values of bits b0 . . . b3 are reserved.

In case of the low capacity data transfer (using TII frame type identifier values "0111", in association with "XX10" and "0100", and frame type identifier value "1111"), the frames having frame type identifier value "1111" are for example, transmitted in channel A of the IEC958 format and the TII frames, if at all, are then transmitted in channel B of the IEC958 format. The low capacity data transfer is especially useful in combination with the presently used channel decoder 8, as only a limited amount of data need be transported.

Thus, the converting means 16 puts the TII and associated data either in a packet for a high capacity data transfer or in a packet for a low capacity data transfer. The same goes for the other data, such as MSC data and FIC data. It may be clear that the above is to be interpreted only as an illustration and not intended to delimit the invention.

As indicated in Table 1, there are frame type identifiers for a low capacity data transfer. These have the values "1111" and "0111" (with its associated values "XX10" and "0100" for indicating the remainder of a packet).

Frames having a frame type identifier value "1111" comprise 8 bits of data DT, preferably at bit locations b8 . . . b15 in the frame of FIG. 3A. A data type identifier DTI is added to the frame at bits b6, b7, for denoting the origin of the data and for indicating the use of a 6-bit field IDF in bits b0 . . . b5 of the frame, as illustrated in Table 2.

TABLE 2

Data type identifier bits b6, b7 in a "1111" frame.

| b6 b7 | Data type and content of IdField |
|---|---|
| 00 | not signalled, IdField reserved |
| 01 | MSC, IdField contains SubChId |
| 10 | FIC, IdField is reserved |
| 11 | reserved, IdField is reserved |

The SubChId is an identifier for identifying a subchannel within the MSC, as explained previously. The channel decoder 8 of FIG. 1 may provide window signals together with the DAB data sequence. Such a window signal is set active at the times during which data is present in the DAB data sequence, which belong to a certain data type. For example, a control unit has derived from the FIC, that a particular subchannel is present in Capacity Units 6, 7 and 8 of the MSC. Now, the control unit instructs the channel decoder 8 to activate window signal 1 at the time that decoded data from Capacity Units 6, 7 and 8 are present on the output of the channel decoder 8. Now, the window signal 1 signals the presence of decoded data from Capacity Units 6, 7 and 8 on its output and the control unit knows that this data is associated with the particular subchannel number. In the frame format, 16 different window signals from the channel decoder can be distinguished by providing a 4-bit window signal identifier at bit locations b16 . . . b19 in the frame. A window signal can be linked to a subchannel by inserting the SubChId in the IdField at bit locations b0 . . . b5 of the frame, in the case of data coming from the MSC. In other cases, the IdField is reserved. One of the window signals may be used for padding, indicating that no data is available.

Frame type identifier value "0111" denotes the header of a TII information packet for the low capacity data transfer, thus also functioning a data type identifier. Frames having frame type values "XX10" and "0100" carry data. In the header frame (value "0111"), a 5-bit word at bit locations b11 . . . b15 is reserved for indicating the Number of Received Transmitters (NRT). NRT can range from 1 to 24. The other values are reserved. There are (NRT-1) continuation frames and one trailer frame, and they are filled as follows. Each of these frames comprises a 5-bit SubId at bit locations b8 . . . b12 and a 7-bit MainId at bits b13 . . . b19, the MainId and SubId being known from subsection 8.1.9 of document "Radio Broadcast Systems; Digital Audio Broadcasting (DAB) to mobile, portable and fixed receivers.", ETS 300 401, published by the European Telecommunications Standards Institute, Sophia Antipolis, 1995. Furthermore, 3 bits (b5 . . . b7) are reserved to indicate a relative fieldstrength, ranging from "001" indicating a very weak signal, to 111 indicating a very strong signal. The value "000" denotes "not signalled". The remaining bits b0 . . . b4 are reserved. As mentioned before, the last data frame has frame type identifier value "0100", but contains the same kind of data as the continuation frames as no specific trailer frame is needed.

In the low capacity data transfer the TII frames can be alternated with the data frames having frame type 1111. Padding frames can be inserted at will.

Frame type identifier value "0001" identifies a header frame of packets for a high capacity data transfer. For this purpose, bits b18 and b19 in the header frame constitute a data type identifier and are reserved for indicating the data type contained in the packet, as shown in Table 3.

TABLE 3

Data type identifier bits b18, b19 in a "0001" frame.

| b18 b19 | Data type |
|---|---|
| 00 | MSC |
| 01 | FIC |
| 10 | TII |
| 11 | reserved |

Frame type identifier value "XX10" signals a continuation frame, i.e., a frame being part of a packet and frame type identifier value "0100" can be regarded as a trailer frame, signalling the end of a packet.

In the case of MSC data being transmitted (b18=0 b19=1), the header frame may comprise in bits b0 . . . b11 the number M of RDI frames, i.e., the length of the packet, and in bits b12 . . . b17 the SubChannel Identifier. The continuation frames all carry data. The penultimate frame in the packet comprises data and padding bits as the total number of data bits may not correspond to the total number of available data bits in the packet. The trailer frame comprises a 16 bit field, which specifies the number of corrected errors detected by re-encoding. Exceptionally, the code "1111 1111 1111 1111" shall indicate that this information is not signalled. In the case of MSC data being transmitted, the frame type identifier having a value of "XX10" is preferably shortened to just the last two bits: "10". From Table 1, it may be clear that these last two bits are sufficient for recognizing a continuation frame. This results in an extra 2 bits (b20 and b21) for data, thus extending the data field from 20 bits to 24 bits. In other cases, where the 2 extra data bits are not needed, these data bits are set to "00".

In the case of FIC data being transmitted (b18=0 b19=1), the header frame comprises two bits indicating the DAB transmission mode, for example, bits b14 and b15. Table 4 shows the values of bits b14 and b15 and the associated DAB transmission mode.

TABLE 4

DAB transmission mode bits b14, b15 in FIC header frame.

| b14 b15 | DAB transmission mode |
|---|---|
| 00 | reserved |
| 01 | Mode I (12 FIBs per 96 ms in a 24 ms burst) |
| 10 | Mode 11 (3 FIBs per 24 ms) |
| 11 | Mode III (4 FIBs per 24 ms) |

In the FIC header frame, 4 bits (for example: bits b10 . . . b13) are reserved for an FIB-number. In DAB transmission modes II and III, the FIB-number field is coded as an unsigned binary number specifying the FIB. In Table 5, the coding of the FIB-number is given.

TABLE 5

Coding of the FIB-number bits b10..b13 in mode I.

| b10..b13 | FIB-number |
|---|---|
| 0000 | FIB 1,1 |
| 1000 | FIB 1,2 |
| 0100 | FIB 1,3 |
| 1100 | FIB 2,1 |
| .... | |
| 1101 | FIB 4,3 |

The trailer frame with frame type identifier value "0100" contains in the case of an FIC packet the following. Three bits (for example, bits b16 . . . b18) are reserved for an Error Indication Type (EIT), specifying the kind of data carried in a 16 bit Error Check Field (ECF), (for example, bits b0 . . . b15). Table 6 shows the codes for the EIT and the related contents in the ECF.

TABLE 6

Coding of the EIT bits b16..b18 and the related ECF

| EIT (b16..b18) | Meaning + contents ECF |
|---|---|
| 000 | No error indication; ECF is reserved |
| 100 | CRC performed, no errors; ECF is reserved |
| 010 | CRC performed, errors detected; ECF contains CRC as received |
| 110 | CRC performed; EDF contains bitwise sum of received and locally calculated CRC |

In DAB transmission mode I, the 12 FIBs contained in one transmission frame may be conveyed in a single, once every 96 ms, or as four series of 3 FIBs at 24 ms intervals.

In the case of TII data being transmitted (b18=1 b19=0), the header frame further comprises a TII format identifier, in this example comprising 3 bits b8 . . . b10. The TII format identifier having a value of "010" denotes a basic format and the value "001" denotes an extended format. Just like in the low capacity format (frame type identifier value="0111"), bits b11 . . . b15 contain the NRT.

In the basic format (b8 . . . b10 in the header being equal to "010"), the remainder of the TII packet is the same as in the low capacity format.

In the extended format (b8 . . . b10 in the header being equal to "001"), the first NRT continuation frames are filled similar as in the basic format, but now bits b1 . . . b4 are used as follows. Bit b1 is a Null Symbol Indicator, which changes when data from a new null symbol is transmitted for the first time. In the extended format, the complex results of the discrete Fourier Transform as performed in the FFT processor 6 of FIG. 1 on the samples of the Null symbol of selected pairs of carriers are provided. To this effect, bits b2 . . . b4 denote the number of carrier pairs (NCP) for which information is provided for the transmitter identified by the MainId and the SubId. In the continuation frames following the number of NRT frames as described above, 16 bits contain, coded as two's complement, the real or imaginary part of the FFT result on the samples of the Null symbol for each the number of carrier pair as denoted by NCP for each transmitter as identified in the number of NRT frames.

The temporal order of transmission of data from MSC Subchannels, the FIC and TII in any format is arbitrary. Padding frames may be inserted at any position. However, as a rule: all data which is related to one logical DAB frame shall be sent within the interval defined by two consecutive transmissions of a synchronization frame. TII data may be sent in several packets if so desired. TII information for each carrier pair shall be transmitted preferably only once per evaluated Null symbol. However, this information may be split over several logical frames. The start of a new data set is indicated by a new value of the Null Symbol Indicator.

In the first sequence, no TII data is present other than the one already incorporated in the FIC. A DAB signal also contains TII data in its Null symbol at the start of each DAB frame. In the present invention, this TII data together with data relating to the relative fieldstrength of the received transmitters is retrieved from the FFT processor 6, and inserted into the second sequence.

In the first sequence, PAD data is embedded together with audio information on the bit stream. For retrieving this PAD data, it is necessary to retrieve first the audio frames and then to retrieve the PAD data therefrom. This is an elaborate operation costing extra hardware. In most DAB receivers, audio decoding means are present, which also retrieve the PAD data from the audio frames. According to the invention, this can be used advantageously by inserting this PAD into the second sequence as a separate sequence. This makes it much easier for a peripheral device, receiving the second sequence, to retrieve the PAD data from the second sequence, as no audio decoding means is required.

FIG. 4 shows an example of the structure of a PAD message for use in a receiver according to the invention, wherein the PAD is retrieved and inserted into the second sequence. The PAD message comprises:

- a header (HDR) for signalling that the message has the structure as described below,
- a length indicator (LI), specifying the number of bytes that follow in the PAD message,
- a two-byte field (F-PAD) carrying the F-PAD as defined in ETS 300 401. The two F-PAD bytes are contained in their logical order,
- if provided, a further field (X-PAD) carrying a number of bytes from the X-PAD field as defined in ETS 300 401. These bytes are also contained in their logical order. Both header and length indicator are preferably a one-byte field, where the header should contain the hexadecimal value "AD" for identifying the message structure. The X-PAD field is optional; its presence and length can be derived from the Length Indicator LI. It is noted here, that the DAB receiver may provide more bytes in the X-PAD field than those that actually contain X-PAD data; in that case, the DAB receiver just conveys bytes from the end of an audio frame without distinction whether these contain audio data or PAD.

In a preferred embodiment, the PAD messages can be conveyed in the User Data channel of the IEC958 interface. This means that the information is to be carried on Information Units (IU), each IU comprising 8 bits, the first one being a Start Flag (SF), always being set at "1", followed by 7 information bits. A User Data message comprises a header of three IU's and a number of data IU's.

Figure 5A:
FIG. 5A is a diagram of the first header IU of a User Data message.

FIG. 5A is a diagram of the first header IU of a User Data message. The first IU comprises first a five-bit field, carrying an identifier for identifying the type of message (TMI). Preferably, this field carries the binary number "10010". It further comprises a Last Flag bit (LF), set at "1" if this message is the last of a series of User Data Messages, that together convey one PAD message. Otherwise, it shall be set at "0". Finally, it also comprises a First Flag bit (FF), which shall be set if this message is the first of a series of User Data Messages that together convey one PAD message. Otherwise, it shall be set at "0".

Figure 5B:
FIG. 5B is a diagram of the second header IU of a User Data message.

FIG. 5B is a diagram of the second header IU of a User Data message. The second IU in the header comprises the message length indicator (LI) of 7 bits. Note, that the third header IU is included in this length value.

Figure 5C:
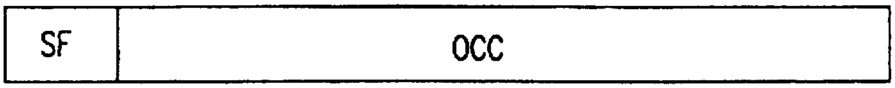
FIG. 5C is a diagram of the third header IU of the User Data message.

FIG. 5C is a diagram of the third header IU of the User Data message. The third IU in the header comprises a 7 bit field (OCC), which preferably duplicates the Originating Category Code of the Channel Status (bits b0 . . . b6 of byte 1) of the IEC958 format.

Figure 5D:
FIG. 5D is a diagram of a data IU of the User Data message. In the figures, identical parts are provided with the same reference numbers.

FIG. 5D is a diagram of a data IU of the User Data message. If the IU carries data, i.e., part of the PAD messages, then the remaining 7 bits can be used for data in the user data field (UDF). In a preferred embodiment, the second bit in the IU (=the first bit of the 7-bit user data field) can be reserved for an error flag (EF) signalling whether an error was detected in the following six user data bits. Thus, a User Data IU can preferably convey 6 bits of user data in the user data field (UDF), and even 7 bits if the error flag is dispensed with. The last UDF in a message may comprise a number of padding bits if less than 6 (or 7) bits are provided.

IU's within a User Data message may be separated by padding bits having a logical value of "0", with a maximum of 8 padding bits, as a bit having a value of "1", following 9 consecutive bits having a logical value of "0" is recognized as the start of a new User Data message. Padding between IU's belonging to different User Data messages is not restricted to a maximum length, as long as its length is at least 9 bits. PAD message not fitting into a single User Data message can be split into several User Data messages. The splitting of the PAD message need not be at a byte-boundary. The header of the User Data message indicates that the message contains DAB-PAD, the length of the User Data message and whether the message is the start, continuation or end of a series of messages, together building a PAD message.

The example given above of additionally inserting the PAD messages in the IEC958 User Data channel is especially advantageous for the following reasons. Electronic circuits are readily available which are adapted to the encoding and decoding of data in the User Data channel, separately from the encoding and decoding of other data. This is very advantageous for reducing the encoding/decoding complexity, especially for those peripheral devices that need to access only the PAD.

The examples given are merely intended as an illustration of the present invention. The embedded data need not be restricted to PAD in DAB data. Furthermore, the PAD may also be provided in other bit streams not conforming to the IEC958 and in another structure as well, without deviating from the scope of the present invention.

I claim:

1. A receiver for receiving a digital transmission signal, said digital transmission signal comprising a channel encoded digital sequence of data, said digital sequence of data comprising a plurality of sequences of different data types, at least one sequence out of said plurality of sequences of different data types being embedded in said digital sequence of data together with at least one other sequence out of said plurality of sequences of different data types, the receiver comprising:

means for channel decoding the received digital transmission signal forming said digital sequence of data;

means for retrieving said at least one sequence out of said plurality of sequences of different data types which had been embedded in the digital sequence of data; and means for supplying at least a part of the digital sequence of data from the received and channel decoded digital transmission signal, characterized in that said supplying means is arranged for adding the retrieved at least one sequence separately from the at least one other embedded sequence to the at least a part of the digital sequence of data.

2. The receiver of claim 1, characterized in that the supplying means also adds a data type identifier to the retrieved at least one sequence for identifying the data type in the at least one sequence.

3. The receiver of claim 1, characterized in that the supplying means also adds a length indicator to the retrieved at least one sequence for identifying a length of the at least one sequence.

4. The receiver of claim 1, characterized in that the digital transmission signal is a Digital Audio Broadcast signal, and in that the at least one sequence is Program Associated Data.

5. A method for supplying at least a part of a digital sequence of data, said digital sequence of data comprising a plurality of sequences of different data types, at least one sequence out of said plurality of sequences of different data types being embedded in the digital sequence of data together with at least one other sequence out of said plurality of sequences of different data types, characterized in that the method comprises the steps:

retrieving said at least one sequence out of said plurality of sequences of different data types which had been embedded in said digital sequence of data; and inserting the retrieved at least one sequence separate from the at least one other embedded sequence into the at least part of the digital sequence of data.

6. The method of claim 5, characterized in that a data type identifier is added to the retrieved at least one sequence for identifying a data type in the retrieved at least one sequence.

7. The method of claim 5, characterized in that a length indicator is added to the retrieved at least one sequence for identifying a length of the retrieved at least one sequence.

8. The method of claim 5, characterized in that the digital transmission signal is a Digital Audio Broadcast signal and in that the at least one sequence is Program Associated Data.

* * * * *